(12) United States Patent
Suzuki et al.

(10) Patent No.: US 8,770,381 B2
(45) Date of Patent: Jul. 8, 2014

(54) BREAD CONVEYING APPARATUS AND BREAD PACKAGING SYSTEM

(75) Inventors: Nobuhiro Suzuki, Fujisawa (JP); Shuichi Iribe, Fujisawa (JP); Michinori Watanabe, Fujisawa (JP); Seiichi Akutsu, Fujisawa (JP)

(73) Assignee: Oshikiri Machinery Ltd., Fujisawa-Shi, Kanagawa-Ken (JP)

( * ) Notice: Subject to any disclaimer, the term of this patent is extended or adjusted under 35 U.S.C. 154(b) by 588 days.

(21) Appl. No.: 12/929,166

(22) Filed: Jan. 5, 2011

(65) Prior Publication Data
US 2012/0067693 A1  Mar. 22, 2012

(30) Foreign Application Priority Data
Sep. 21, 2010  (JP) ................. 2010-211466

(51) Int. Cl.
B65G 19/02 (2006.01)
B65G 47/24 (2006.01)
B65G 47/66 (2006.01)

(52) U.S. Cl.
CPC ........... *B65G 47/24* (2013.01); *B65G 47/66* (2013.01); *B65G 19/02* (2013.01)
USPC ............. 198/399; 198/600; 198/728; 53/571

(58) Field of Classification Search
USPC .......... 198/399, 600, 697, 698, 699.1, 690.2, 198/725, 726, 728, 734, 730, 731, 733; 53/571, 572
See application file for complete search history.

(56) References Cited

U.S. PATENT DOCUMENTS

| | | | | |
|---|---|---|---|---|
| 1,969,994 A | * | 8/1934 | Stevenson | 414/796.8 |
| 3,340,672 A | * | 9/1967 | Kayser | 53/153 |
| 3,358,414 A | | 12/1967 | Hersh et al. | |
| 3,417,546 A | * | 12/1968 | Irwin | 53/573 |
| 3,421,286 A | | 1/1969 | Chambles | |
| 3,421,287 A | * | 1/1969 | Sheets | 53/573 |
| 3,451,192 A | * | 6/1969 | Irwin | 53/58 |
| 3,507,090 A | * | 4/1970 | Angelo | 53/74 |
| 3,538,671 A | | 11/1970 | Wallace | |
| 3,556,316 A | | 1/1971 | Marasso et al. | |
| 3,579,957 A | | 5/1971 | Mills, Jr. et al. | |
| 4,463,627 A | | 8/1984 | Zelle | |
| 4,671,048 A | | 6/1987 | Rademacher | |

(Continued)

FOREIGN PATENT DOCUMENTS

JP  44-1594  1/1969
JP  63-21 A  1/1988

OTHER PUBLICATIONS

"Top and Bottom Scoops" dated Nov. 17, 2009.

*Primary Examiner* — William R Harp
(74) *Attorney, Agent, or Firm* — McGinn IP Law Group, PLLC (57) ABSTRACT

A bread conveying apparatus includes a pair of rolling members spaced apart from each other along a loaf bread conveying path, an endless revolving member wound around the pair of rolling members and laid along the conveying path, a first flight mounted to the endless revolving member to urge the loaf bread along the conveying path and carry the loaf bread to a predetermined position, and a second flight mounted to the endless revolving member upstream of the first flight along the conveying path to urge the loaf bread so as to align the loaf bread with the predetermined position.

10 Claims, 6 Drawing Sheets

(56) References Cited

U.S. PATENT DOCUMENTS

| | | |
|---|---|---|
| 4,694,715 A | 9/1987 | Jongerius |
| 5,327,704 A * | 7/1994 | Hoekzema et al. ............ 53/459 |
| 5,477,662 A | 12/1995 | Rompa |
| 5,502,956 A * | 4/1996 | Rompa ........................ 53/572 |
| 5,743,071 A | 4/1998 | Wolthuizen |
| 6,134,865 A * | 10/2000 | Long ............................ 53/540 |
| 6,421,984 B1 | 7/2002 | Murgatroyd et al. |
| 6,584,753 B2 | 7/2003 | Dharssi et al. |
| 6,662,525 B2 | 12/2003 | Dharssi et al. |
| 6,766,898 B2 | 7/2004 | Lessard et al. |
| 6,792,737 B2 | 9/2004 | Dharssi et al. |

\* cited by examiner

BREAD CONVEYING APPARATUS AND BREAD PACKAGING SYSTEM

BACKGROUND OF THE INVENTION

1. Field of the Invention

The present invention relates to a bread conveying apparatus for conveying loaf breads and to a bread packaging system which includes the bread conveying apparatus and packages loaf breads. In particular, the invention relates to a bread conveying apparatus which can place a loaf bread at a predetermined position and a bread packaging system that includes the bread conveying apparatus.

2. Description of the Related Art

Bread packaging systems have been employed for packing loaf breads, elongated in one direction (for example, by a 3-loaf length), into packaging materials such as polyethylene bags. For example, such a conventional bread packaging system was disclosed in Japanese Examined Patent Publication No. Sho. 44-1594 (JP1969-1594B). This conventional bread packaging system allows a loaf bread to be conveyed on an in-feed conveyor into a scoop and then received by the reciprocating motion of the scoop in a packaging material made of polyethylene. The loaf bread received in the bag is dropped from the scoop onto a discharge conveyor. Furthermore, the packaged loaf bread is conveyed on the discharge conveyor to the next step (for example, the step for sealing the bag).

Note that the loaf bread packaging scoop moves forward across the loaf bread conveying path and holds a packaging material. Then, the scoop holding the packaging material moves now backward across the conveying path, so that the loaf bread is received in the packaging material. The packaged loaf bread is dropped onto the conveying path. In this manner, the conventional bread packaging system allows the scoop to move back and forth for wrapping loaf breads.

The scoop includes a lower scoop for holding loaf breads. The lower scoop includes a flat base portion on which a loaf bread is placed, a downstream flange continuing to the downstream end of the base portion to extend upward, and an upstream flange continuing to the upstream end of the base portion to extend upward. Furthermore, when viewed across the conveying path, the length of the upstream flange is less than that of the downstream flange. When viewed across the conveying direction, the downstream side of the base portion of the lower scoop is tilted downward.

The conventional bread conveying apparatus and bread packaging system could not easily place the loaf bread precisely at a predetermined position of the member in the next step or the destination of conveyance by the bread conveying apparatus (the lower scoop of the loaf bread packaging apparatus in the case of the bread packaging system). This is because when the loaf bread is dropped, its own elasticity may cause the loaf bread to be bounced up and thereby dislocated from the predetermined position. As a result, the loaf bread located off the predetermined position may possibly be treated improperly in the subsequent step. It was therefore difficult to further improve the throughput of the bread conveying apparatus and the bread packaging system.

SUMMARY OF THE INVENTION

The present invention was developed in view of the problems mentioned above. It is therefore an object of the invention to provide a simply structured bread conveying apparatus which can precisely place the loaf bread at a predetermined position of the destination of the loaf bread conveyed. It is another object of the invention to provide a bread packaging system which ensures that the bread conveying apparatus places a loaf bread at a predetermined position of the scoop of a loaf bread packaging apparatus.

To resolve the above problem and to attain the object, a bread conveying apparatus according to one aspect of the invention comprises: a pair of rolling members spaced apart from each other along a loaf bread conveying path; an endless revolving member wound around said pair of rolling members and laid along said conveying path; a first flight mounted to said endless revolving member to urge said loaf bread along said conveying path and carry said loaf bread to a predetermined position; and a second flight mounted to said endless revolving member upstream of said first flight along said conveying path to urge said loaf bread so as to align said loaf bread with said predetermined position.

Further, to resolve the above problem and to attain the object, a bread packaging system according to other aspect of the invention includes a bread conveying apparatus and a loaf bread packaging apparatus including a scoop, the scoop receiving the loaf bread placed by the bread conveying apparatus and serving to package the loaf bread, wherein the predetermined position is located on the base portion.

A bread conveying apparatus according to another aspect of the present invention has a simple structure which enables a loaf bread to be conveyed to a next step without causing the loaf bread to be deformed, scratched, or partially torn off. The bread conveying apparatus includes: a pair of rolling members spaced apart from each other along a conveying path on which a loaf bread is carried; an endless revolving member wound around said pair of rolling members and laid along said transport path; and a flight mounted to said endless revolving member to urge said loaf bread along said conveying path and carry said loaf bread to a predetermined position. Said flight has a contact portion to be in contact with said loaf bread, and said contact portion is curved.

The bread conveying apparatus and bread packaging system according to the present invention have a simple structure with a first flight and a second flight, which enables the second flight to align a loaf bread with a predetermined position even when the loaf bread carried on the first flight is dislocated from the predetermined position. Therefore, this configuration can ensure that the loaf bread is conveyed to the predetermined position.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Now, referring to the accompanying drawings, a description will be made to a loaf bread conveying apparatus 105 and a loaf bread packaging system 101 according to an embodiment of the present invention. Note that the present invention is not limited to these embodiments. Also note that as used herein, the term "downstream" refers to the direction in which a loaf bread is conveyed and the term "upstream" is the direction opposite thereto. The term "right (or left)" is defined as the rightward (or leftward) direction when viewed in the direction in which a loaf bread is conveyed (toward the downstream side).

[First Embodiment]

Figure 1:
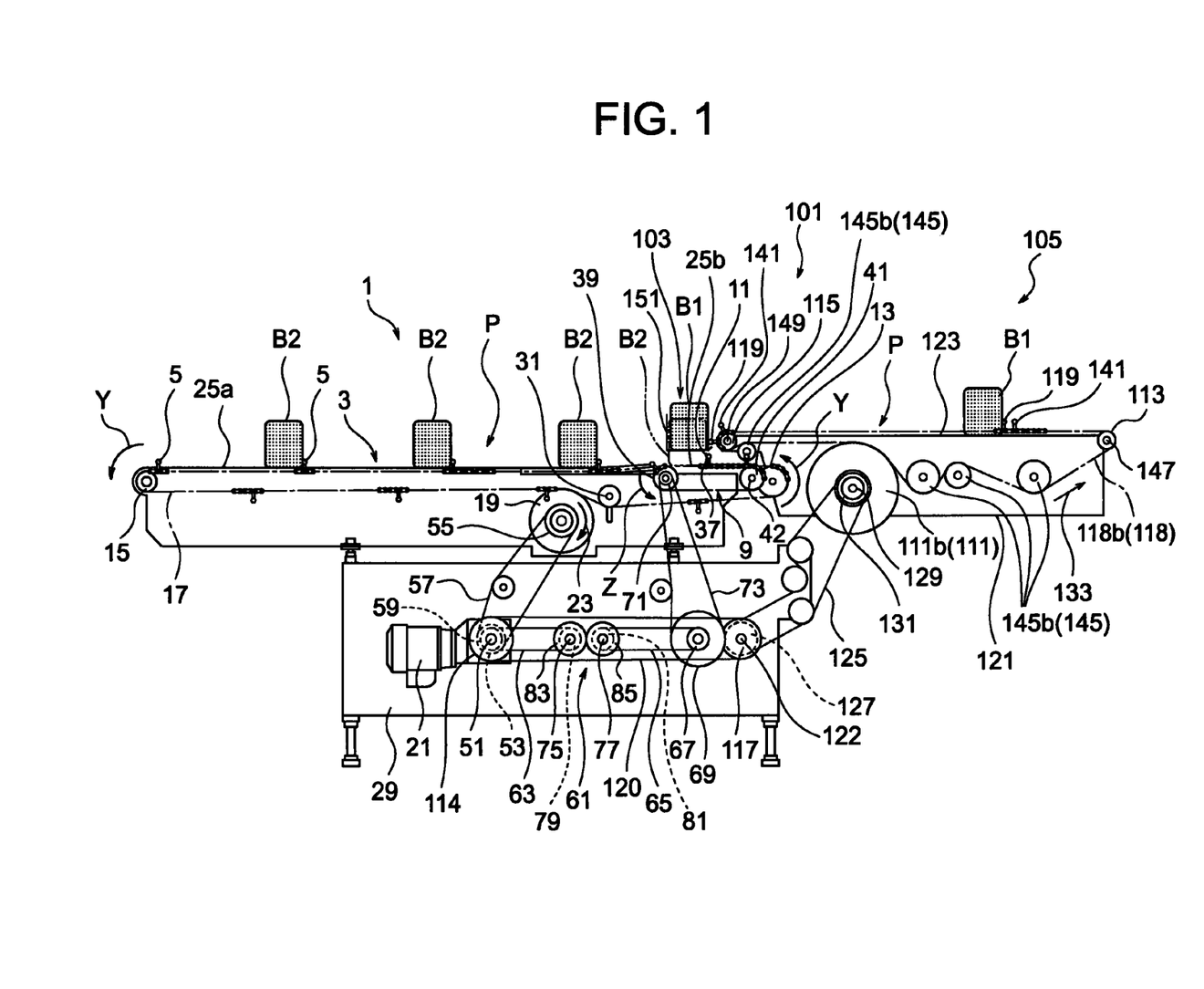
FIG. 1 is a schematic side view illustrating the main components of a loaf bread packaging system according to a first embodiment.
Figure 2:
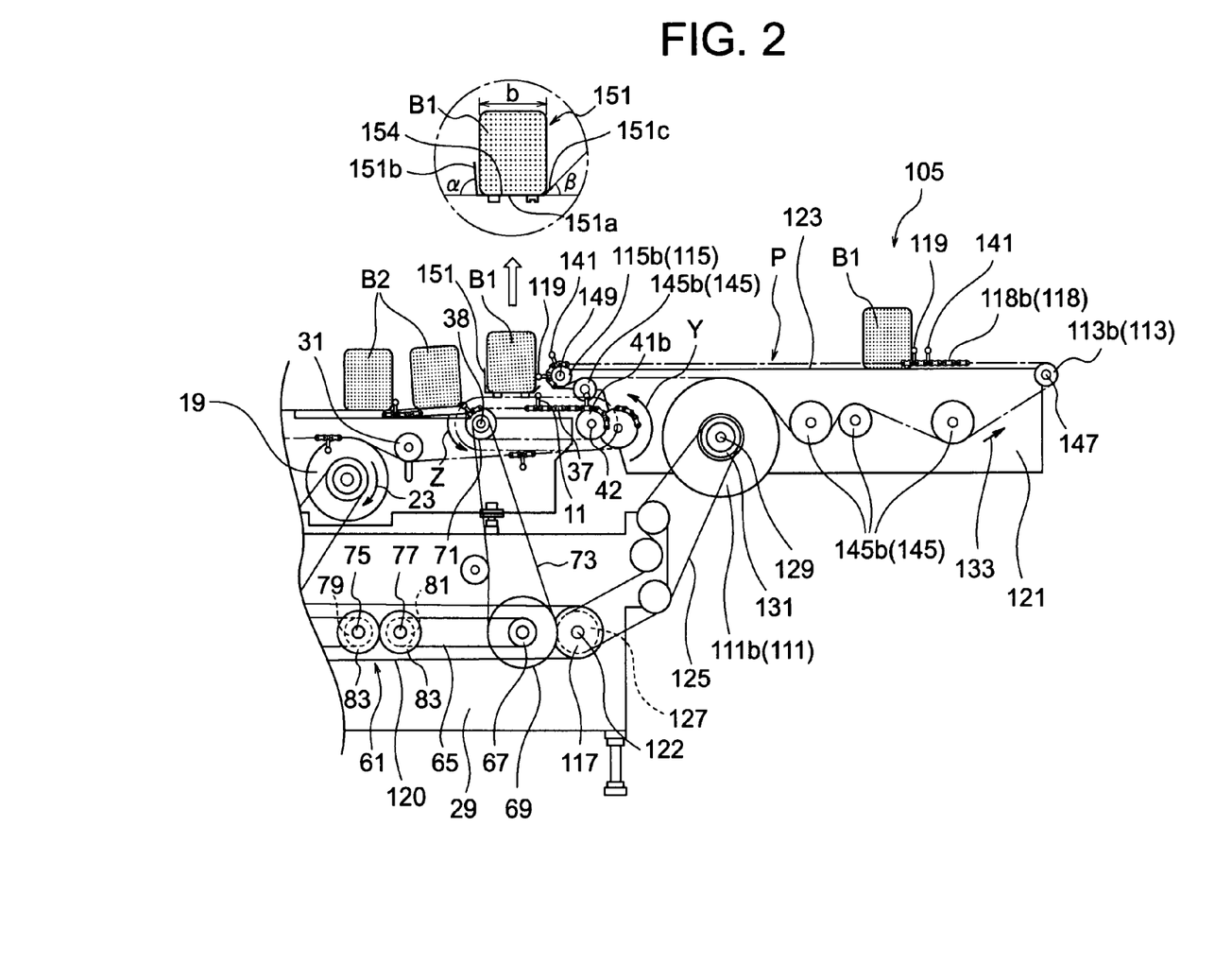
FIG. 2 is a side view mainly illustrating a loaf bread conveying apparatus shown in FIG. 1.
Figure 3:
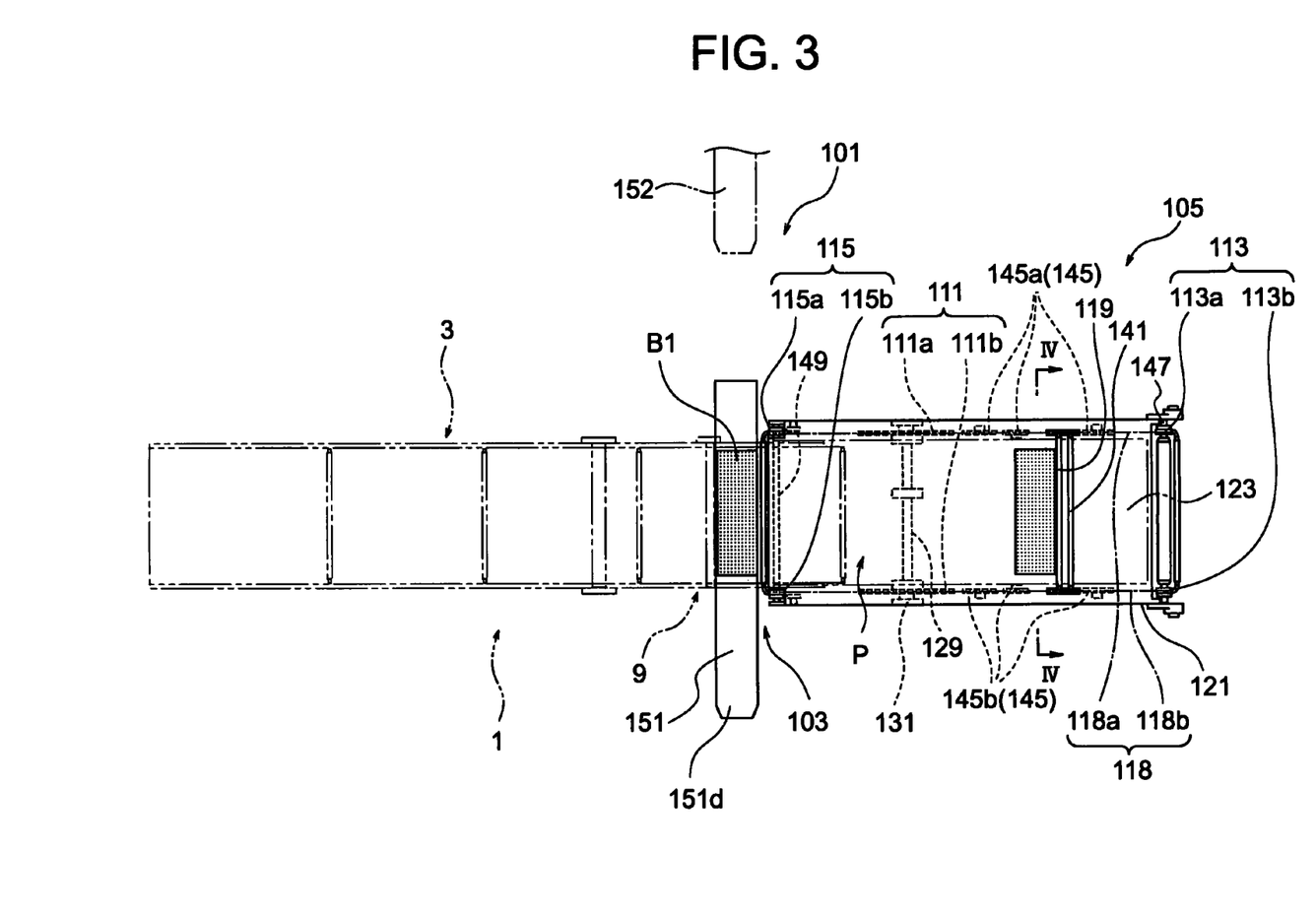
FIG. 3 is a plan view mainly illustrating the loaf bread conveying apparatus of FIG. 1.
Figure 4:
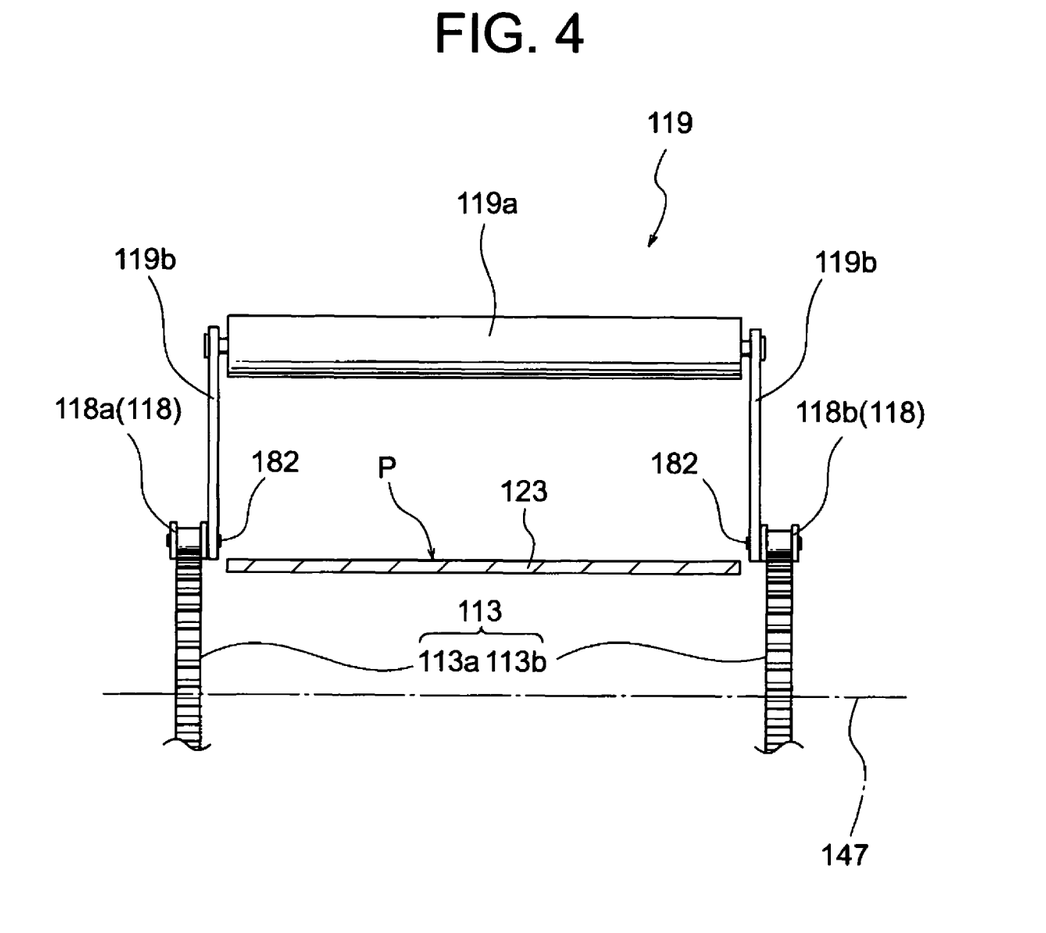
FIG. 4 is a partially cross-sectional view taken along line IV-IV of FIG. 3.

FIG. 1 is a schematic side view illustrating the main components of a loaf bread packaging system according to a first embodiment; FIG. 2 is a side view mainly illustrating a loaf bread conveying apparatus shown in FIG. 1; FIG. 3 is a plan view mainly illustrating the loaf bread conveying apparatus of FIG. 1; and FIG. 4 is a partially cross-sectional view taken along line IV-IV of FIG. 3. In FIG. 3, to clearly illustrate each component, the loaf bread conveying apparatus 105 and the loaf bread packaging apparatus 103 are shown with solid lines, while a discharge conveyor 1 is illustrated with a chain double-dashed line.

The loaf bread conveying apparatus, that is, the in-feed conveyor 105 mainly includes: a pair of rolling members arranged, one on the upstream side of a conveying path P along which a loaf bread B1 is carried and the other on the downstream side, i.e., an in-feed upstream end sprocket wheel 113 and a downstream end sprocket wheel 115; an endless revolving member, or an in-feed endless chain 118, which is wound around the in-feed upstream end sprocket wheel 113 and the downstream end sprocket wheel 115 and laid along the conveying path P; and a first in-feed flight 119 and a second in-feed flight 141, the first in-feed flight 119 serving as a first flight mounted to the in-feed endless chain 118 to urge the loaf bread Bi along the conveying path P, while the second in-feed flight 141 acts as a second flight located upstream of the first in-feed flight 119 to place the loaf bread B1 at a predetermined position.

The in-feed upstream end sprocket wheel 113 and the in-feed downstream end sprocket wheel 115 are rotatably secured to an in-feed main body 121 that extends along the conveying path P. Note that the aforementioned predetermined position in the first embodiment refers to a horizontal plane 154 on a base portion 151a of a lower scoop 151.

Furthermore, the conveying path P along which the loaf bread B1 is carried on the in-feed conveyor 105 includes an in-feed plate 123 which is a rectangular plate member when viewed from above (see FIG. 3). Accordingly, the in-feed plate 123 constitutes the upper surface of the in-feed main body 121 (see FIGS. 1 and 2). The in-feed plate 123 is horizontally secured to the in-feed main body 121 so that the loaf bread B1 slides along the in-feed plate 123. Furthermore, the in-feed main body 121 is supported on the floor on which the in-feed conveyor 105 is installed using support members (not shown). Note that in FIG. 3, the in-feed plate 123 is denoted with chain double-dashed lines for clarity of illustration.

The in-feed plate 123 extends at a higher level in the upper and lower direction in FIG. 1 than a carrier plate 25 of the discharge conveyor 1, to be described later. Thus, the in-feed plate 123 and the carrier plate 25 differ in height from the floor on which the loaf bread packaging system 101 is installed.

The in-feed conveyor 105 further includes an in-feed drive sprocket wheel 111 on the outer circumference side of the in-feed endless chain 118, so that the rotational force from a drive motor 21 is transmitted to the in-feed endless chain 118 via the in-feed drive sprocket wheel 111. Note that it is also possible to use a servo motor as the drive motor.

The in-feed endless chain 118 is constituted by a right in-feed endless chain member 118a and a left in-feed endless chain member 118b, which are disposed in parallel to each other along both the ends that oppose to each other across the shorter side of the in-feed plate 123 (in the vertical direction in FIG. 3). Furthermore, the right in-feed endless chain member 118a is wound around a right upstream end sprocket wheel 113a and a right downstream end sprocket wheel 115a. On the other hand, the left in-feed endless chain member 118b is wound around a left upstream end sprocket wheel 113b and a left downstream end sprocket wheel 115b.

The upstream end sprocket wheel 113 is constituted by the right upstream end. sprocket wheel 113a and the left upstream end sprocket wheel 113b which is attached to an upstream end shaft 147 that extends along the shorter side of the in-feed plate 123. The downstream end sprocket wheel 115 is constituted by the right downstream end sprocket wheel 115a and the right downstream end sprocket wheel 115b which are attached to a downstream end shaft 149 that extends along the shorter side of the in-feed plate 123. The upstream end shaft 147 and the downstream end shaft 149 are rotatably supported at the upstream end and the downstream end of the conveying path P of the in-feed main body 121, respectively. Furthermore, the downstream end shaft 149 and the upstream end shaft 147 extend in parallel to each other.

Furthermore, the first and second in-feed flights 119 and 141 extend so as to connect between the right in-feed endless chain member 118a and the left in-feed endless chain member 118b. The first and second in-feed flights 119 and 141 extend upwardly in the vertical direction with respect to the in-feed plate 123 (upwardly in the upper and lower direction in FIGS. 1 and 2), and are securely spaced apart from each other by a predetermined distance in the circumferential direction of the in-feed endless chain members 118a and 118b. Furthermore, a plurality of sets of first and second in-feed flights 119 and 141 are mounted at equal intervals in the circumferential direction of the right in-feed endless chain member 118a and the left in-feed endless chain member 118b.

Now, a description will be made to the first and second in-feed flights 119 and 141. Since the first and second in-feed flights 119 and 141 are the same in shape and size, only the first in-feed flight 119 will be explained. As shown in FIG. 4, the first in-feed flight 119 has an in-feed contact portion 119a to contact with the loaf bread B1 and two in-feed flight support portions 119b for rotatably supporting the in-feed contact portion 119a.

The in-feed contact portion 119a is a cylindrical member which is made of metal and has a predetermined radius of curvature (i.e., circular in cross-section in a direction orthogonal to the longitudinal direction of the in-feed contact portion 119a.) The two first in-feed flight support portions 119b are each a plate-shaped member extending perpendicular to the in-feed plate 123. Their longitudinal lengths are sized so that the in-feed contact portion 119a can abut against a loaf bread B2 carried on the in-feed plate 123. The two in-feed flight support portions 119b are secured respectively to the right in-feed endless chain member 118a and the left in-feed endless chain member 118b by means of pins 182.

Furthermore, the right and left in-feed endless chain members 118a and 118b mate at the outer circumference sides of those in-feed endless chain members with the right and left in-feed drive sprocket wheels 111a and 111b, which constitute the in-feed drive sprocket wheel 111, respectively, to transmit rotational force as will be described later. Furthermore, in the first embodiment, there is also disposed a tension adjusting sprocket wheel 145, for adjusting the tension of the in-feed endless chain 118, between the in-feed upstream end sprocket wheel 113 and the in-feed downstream end sprocket wheel 115.

That is, between the right upstream end sprocket wheel 113a and the right downstream end sprocket wheel 115a, there is disposed a right tension adjusting sprocket wheel 145a for adjusting the tension of the right in-feed endless chain member 118a. Likewise, between the left upstream end sprocket wheel 113b and the left downstream end sprocket wheel 115b, there is disposed a left tension adjusting sprocket wheel 145b for adjusting the tension of the left in-feed endless chain member 118b.

As shown in FIG. 1, the in-feed conveyor 105 is supplied with rotational force by the drive motor 21 or a drive source to be disposed in an apparatus main body 29. The drive shaft 51 that rotates via a worm gear (not shown) by means of the drive motor 21 is provided with an in-feed sprocket wheel 114. There is also provided an in-feed transmission chain 120 which is wound around both the in-feed sprocket wheel 114 and an in-feed transmission sprocket wheel 117.

The in-feed transmission sprocket wheel 117 has a rotation shaft 122 to which an in-feed transmission sprocket wheel 127 is attached concentrically with the in-feed transmission sprocket wheel 117. There is provided a transmission endless chain 125 which is wound around the in-feed transmission sprocket wheel 127 and an in-feed transmission sprocket wheel 131 (see FIG. 1). To the in-feed drive shaft 129 equipped with the in-feed transmission sprocket wheel 131, the in-feed drive sprocket wheels 111a and 111b are attached concentrically with the in-feed transmission sprocket wheel 131.

As such, the rotational force from the drive motor 21 is transmitted to the in-feed transmission sprocket wheel 131 via the in-feed sprocket wheel 114, the in-feed transmission chain 120, the in-feed transmission sprocket wheel 117, the in-feed transmission sprocket wheel 127, and the transmission endless chain 125. Rotating the in-feed transmission sprocket wheel 131 causes the in-feed drive shaft 129 to revolve, thereby turning the in-feed drive sprocket wheels 111a and 111b. Rotating the in-feed drive sprocket wheels 111a and 111b causes the in-feed endless chain 118 to move circularly in the direction indicated by an arrow 133. Accordingly, the loaf bread B1 supplied from the preceding step is carried on the in-feed plate 123 by the first in-feed flight 119 from the in-feed upstream end sprocket wheel 113 to the in-feed downstream end sprocket wheel 115 along the conveying path P.

[Loaf Bread Packaging Apparatus]

Now, a description will be briefly made as to how the loaf bread packaging apparatus 103 of the loaf bread packaging system 101 is organized and operated. The loaf bread B1 is introduced on the in-feed conveyor 105 into the loaf bread packaging apparatus 103. The loaf bread packaging apparatus 103 includes a scoop for holding packaging materials such as polyethylene bags for receiving the loaf bread B1 and a reciprocating mechanism for reciprocating the scoop across the conveying path P. The reciprocating mechanism built in a known structure will neither be explained in more detail nor illustrated in the drawings.

FIGS. 1 to 3 illustrate only the lower scoop 151 that constitutes the scoop of the loaf bread packaging apparatus 103. Note that the upper scoop built in a known structure will neither be explained in more detail nor illustrated in the drawings. Note that FIGS. 1 and 2 show a front view of the lower scoop 151 of the loaf bread packaging apparatus 103.

The figures illustrate by solid lines the lower scoop 151 that has arrived at the advanced position where its end portion 151d and the end portion of the upper scoop (not shown) hold a packaging material. In this state, the loaf bread B1 carried on the in-feed conveyor 105 is guided into the lower scoop 151. Furthermore, FIG. 3 also shows a lower scoop 151 at a retreated position 152 with chain double-dashed lines.

As shown in FIG. 1, the base portion 151a of the L-shaped lower scoop 151 in the upper and lower direction is located above a carrier platform 25 and below the in-feed plate 123. Furthermore, as a matter of course, the lower scoop 151 is located so as not to interfere the motion of first and second flights 5 and 11 of the discharge conveyor 1.

When viewed across the conveying path P (in a side view of the in-feed conveyor 105 or in the front-to-back direction of the paper on which FIG. 1 is illustrated), the lower scoop 151 for holding the loaf bread B1 has a base portion 151a with a horizontal plane, a downstream flange 151b continuing to the downstream end of the base portion 151a and extending upward, and an upstream flange 151c continuing to the upstream end of the base portion 151a. Furthermore, the base portion 151a of the lower scoop 151 extends horizontally, whereas the downstream flange 151b and the upstream flange 151c extend to be spaced apart from each other with increasing distance from the base portion 151a. Furthermore, the tilt angle α of the downstream flange 151b with respect to the base portion 151a is greater than 0 degrees and less than 90 degrees. Furthermore, the tilt angle β of the upstream flange 151c relative to the base portion 151a is greater than 0 degrees and less than 90 degrees.

Furthermore, when viewed across the conveying path P, the upstream flange 151c is sized to be less in length than the downstream flange 151b. This ensures that the flange 151b receives the loaf bread B1 dropped from the upstream side of the scoop 151 beyond the in-feed downstream end sprocket wheel 115 of the in-feed conveyor 105.

Furthermore, when viewed across the conveying path P, the length of the base portion 151a is sized to be generally equal to the length b of one side of the loaf bread B1. Accordingly, the upstream flange 151c and the downstream flange 151b which are tilted have a function of guiding onto the base portion 151a the loaf bread B1 that is dropped onto the lower scoop 151.

After the loaf bread B1 is placed on the lower scoop 151, the lower scoop 151 may retreat toward the retreated position (as shown by an alternate long and short dashed line (reference number 152)). This causes the loaf bread B1 to be kept on the lower scoop 151 and above the conveying path P by a holding member (not shown). Thus, the loaf bread B1 is received in an opened packaging material held by the end portion 151d of the lower scoop 151.

Furthermore, when the scoop completely arrives at the retreated position 152, the packaged loaf bread B2 kept by the holding member (not shown) above the conveying path P is dropped from the lower scoop 151 onto a carrier platform 5 of a first discharge conveyor 3. Furthermore, in the first embodiment, the region of the base portion 151a of the lower scoop 151 on which the loaf bread B1 and a second carrier platform 25b are horizontal. This allows the loaf bread B2 to be kept at the same posture between before and after it is dropped. As a result, the loaf bread B2 can be landed on the second carrier platform 25b with stability.

[Discharge Conveyor]

As shown in FIGS. 1 to 3, the discharge conveyor 1 is located downstream of the loaf bread packaging apparatus 103. The discharge conveyor 1 carries a packaged loaf bread B2 to the next step. Now, the discharge conveyor 1 will be briefly described below.

The discharge conveyor 1 mainly includes: a first discharge conveyor 3 disposed along the conveying path P to convey a loaf bread B2; a first flight 5 mounted to the first discharge conveyor 3 to urge the loaf bread B2; a second discharge conveyor 9 disposed along the conveying path P to pass through a common region that partially overlaps the region above the conveying path P through which the first discharge conveyor 3 passes; and a second flight 11 which is mounted to the second discharge conveyor 9 to urge the loaf bread B2 on the common region.

That is, a second drive sprocket wheel 39 is located downstream of an upstream end sprocket wheel 13 along the conveying path P, while a second driven sprocket wheel 41 is located upstream of a downstream end sprocket wheel 15 along the conveying path P. Accordingly, to avoid interference between first and second endless chains 17 and 37, the first endless chain 17 and the second endless chain 37 are located at different positions across the shorter side of the conveying path P.

Furthermore, the conveying speed at which the second discharge conveyor 9 conveys the loaf bread B2 (in the Y direction) is greater than the conveying speed at which the first discharge conveyor 3 carries the loaf bread B2.

Now, the drive system of the discharge conveyor 1 will be briefly described below. As shown in FIG. 1, the rotation shaft (not shown) of the drive motor 21 is coupled to the drive shaft 51 via a worm gear (not shown) or the like. A first carrier sprocket wheel 53 is attached to one end of the drive shaft 51. There is provided a first conveying drive chain 57 that is wound around both the first carrier sprocket wheel 53 and a first driven sprocket wheel 55 which is concentrically secured to the rotation shaft of a drive sprocket wheel 19. Accordingly, the rotational force of the drive motor 21 is transmitted to the first drive sprocket wheel 19 via the first carrier sprocket wheel 53, the first conveying drive chain 57, and the first driven sprocket wheel 55.

Furthermore, a second carrier sprocket wheel 59 is attached to the drive shaft 51 shown in FIG. 1. The second carrier sprocket wheel 59 is coupled to a transmission mechanism 61, which is disposed generally at the center of the apparatus main body 29, via a first transmission chain 63. Furthermore, the transmission mechanism 61 is coupled to a transmission sprocket wheel 67 via a second transmission chain 65. A coaxial sprocket wheel 69 is attached to the rotation shaft mounted to the transmission sprocket wheel 67 concentrically with the transmission sprocket wheel 67. As shown in FIG. 1, there is also provided a third transmission chain 73 which is wound around both the coaxial sprocket wheel 69 and a drive transmission sprocket wheel 71 which is secured to a second drive shaft 38. Accordingly, the rotational force of the drive motor 21 is transmitted to the second drive sprocket wheel 39 via each component and the drive transmission sprocket wheel 71.

The transmission mechanism 61 has an input gear 83, to which rotational force is transmitted by the first transmission chain 63 wound around an input sprocket wheel 79 that is coaxial with the input gear 83. The rotational force of the input gear 83 is transmitted to an output gear 85 that is meshed with the input gear 83. The output gear 85 is attached to a second transmission shaft 77. Accordingly, the rotational force of the output gear 85 is transmitted to an output sprocket wheel 81. The second transmission chain 65 is wound around the output sprocket wheel 81 and the transmission sprocket wheel 67. Accordingly, the rotational force of the output sprocket wheel 81 is transmitted to the transmission sprocket wheel 67 via the second transmission chain 65.

As described above, the loaf bread conveying apparatus 1 of the first embodiment is configured such that the rotational force from a single drive motor activates the first discharge conveyor 3 and the second discharge conveyor 9. Furthermore, the conveying speeds of the first discharge conveyor 3 and the second discharge conveyor 9 can be adjusted by varying the number and the size of the components that constitute the aforementioned drive system.

[Operation of Loaf Bread Packaging System]

The in-feed conveyor 105 conveys the loaf bread B1 having been made in the preceding step along the conveying path P by allowing the first in-feed flight 119 to urge the loaf bread B1. The first in-feed flight 119 travels at a constant speed, and the drive motor 21 is controlled by a control section (not shown) to the timing at which the loaf bread B1 is guided into the loaf bread packaging apparatus 103. As described above, when the first in-feed flight 119 reaches the in-feed downstream end sprocket wheel 115 and starts moving around the downstream end shaft 149, the loaf bread B1 is dropped from the in-feed plate 123 onto the lower scoop 151.

When the loaf bread B1 is dropped, the loaf bread B1 may not land at a predetermined position on the lower scoop 151. This is because a difference in height between the lower scoop 151 and the in-feed plate 123 and the elasticity the loaf bread B1 itself has can cause the loaf bread B1 to bounce off the lower scoop 151 when being dropped. For example, suppose that the loaf bread B1 is partially stranded on the upstream flange 151c. In this case, the second in-feed flight 141 following the first in-feed flight 119 moves around the downstream end shaft 149, thereby causing the in-feed contact portion of the second in-feed flight 141 (see 119a of FIG. 4) to urge the loaf bread B1 onto the base 151a. Accordingly, this arrangement with two flights is capable of placing the loaf bread B1 at a predetermined position on the lower scoop 151.

As such, the first in-feed flight 119 functions to drop the loaf bread B1 from the in-feed plate 123 to the lower scoop 151, while the second in-feed flight 141 serves to align the loaf bread B1 to position the loaf bread B1 at a predetermined position. The first flight 119 and the second flight 141 can be designed to be different from each other in size and shape.

Furthermore, the in-feed contact portion 119a (and the contact portion of the second in-feed flight) is circular in longitudinal cross-section and rotatable. Accordingly, when the first and second in-feed flights 119 and 141 leave the loaf bread Bi, i.e., as the in-feed contact portion 119a rotates around the downstream end shaft 149 of the in-feed downstream end sprocket wheel 115, the in-feed contact portion 119a is smoothly separated from the loaf bread B1. The in-feed contact portion 119a constructed in this manner makes it possible to prevent the loaf bread B1 from being deformed, scratched, or partially torn off.

The loaf bread B1 placed on the lower scoop 151 proceeds to the packaging step. When the lower scoop 151 for holding a packaging material goes back to the retreated position 152, the loaf bread B1 placed on the base 151a is received in a packaging material and dropped onto the discharge conveyor 1.

It is the second flight 11 which first contacts with the loaf bread B2 after having been dropped. In the common region of the conveying path P, the second flight 11 carries the loaf bread B2. The loaf bread B2 is moved at the conveying speed of the second endless chain 37 to the most downstream position of the common region, that is, to a point at which the second flight 11 moves around the second drive sprocket wheel 39 and the contact portion of the second flight leaves the loaf bread B2.

The loaf bread B2 having been dropped onto the second carrier platform 25b is relocated by the second flight 11 to a place where the reciprocating motion of the scoop is not interfered, thereby allowing for starting the next step of packaging the loaf bread B1. The loaf bread B2 conveyed by the second flight 11 is allowed to slide by the first flight 5 along the first carrier platform 25a and thus be conveyed toward the downstream end sprocket wheel 15 along the conveying path P.

[Second Embodiment]

Now, a description will be made to a loaf bread conveying apparatus 205 and a loaf bread packaging system 201 according to a second embodiment. The loaf bread conveying apparatus 205 and the loaf bread packaging system 201 according to the second embodiment include only a first in-feed flight and are different, only in that point, from the loaf bread conveying apparatus 105 and the loaf bread packaging system 101 according to the first embodiment which have the first in-feed flight and the second in-feed flight.

The loaf bread conveying apparatus 205 and the loaf bread packaging system 201 aim to solve the problems that a loaf bread may be deformed, scratched, or partially torn off by a projected portion of the flights depending on the shape and material of the loaf bread. These problems arise when a conventional bread transport apparatus transfers a loaf bread to the next step (to the lower scoop of the loaf bread packaging apparatus in the case of the bread packaging system).

Now, referring to FIGS. 5 and 6, the loaf bread packaging system 201 according to the second embodiment will be described mainly in relation to the different points from the first embodiment. Note that the components and arrangements, which are not mentioned in the descriptions below, as well as the functions, operations, and effects that are implemented by those components and arrangements are the same as those of the loaf bread packaging system 101 according to the first embodiment.

Figure 5:
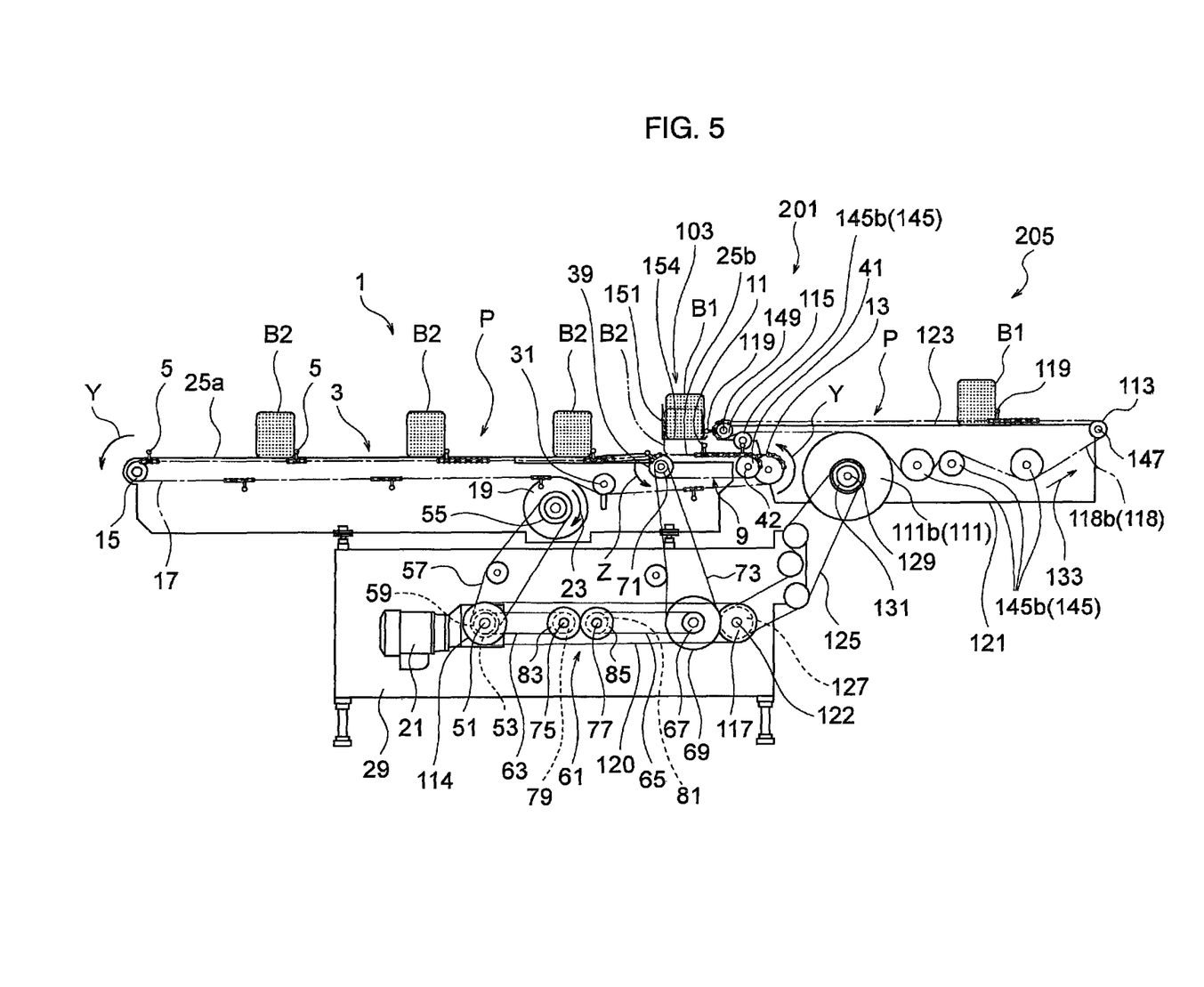
FIG. 5 is a schematic side view illustrating the main components of a loaf bread packaging system according to a second embodiment.

FIG. 5 is a schematic side view illustrating the main components of the loaf bread packaging system 201 according to the second embodiment. FIG. 6 is a plan view mainly illustrating the loaf bread conveying apparatus 205 of FIG. 5. Note that for clarity of illustration, FIG. 6 shows the loaf bread conveying apparatus 205 and the loaf bread packaging apparatus 103 with solid lines and the discharge conveyor 1 by a chain double-dashed line.

The loaf bread conveying apparatus, that is, the in-feed conveyor 205 mainly includes: a pair of rolling members disposed upstream and downstream of the conveying path P along which the loaf bread B1 is carried, i.e., the in-feed upstream end sprocket wheel 113 and the downstream end sprocket wheel 115; an endless revolving member, or an in-feed endless chain 118, which is wound around the in-feed upstream end sprocket wheel 113 and the downstream end sprocket wheel 115 and laid along the conveying path P; and a flight, or a first in-feed flight 119, which is mounted to the in-feed endless chain 118 to urge the loaf bread B1 along the conveying path P.

The in-feed upstream end sprocket wheel 113 and the in-feed downstream end sprocket wheel 115 are rotatably secured to an in-feed conveying base 121 that extends along the conveying path P. Note that the aforementioned predetermined position in the second embodiment refers to a horizontal plane 154 on the base portion 151a of the lower scoop 151.

Figure 6:
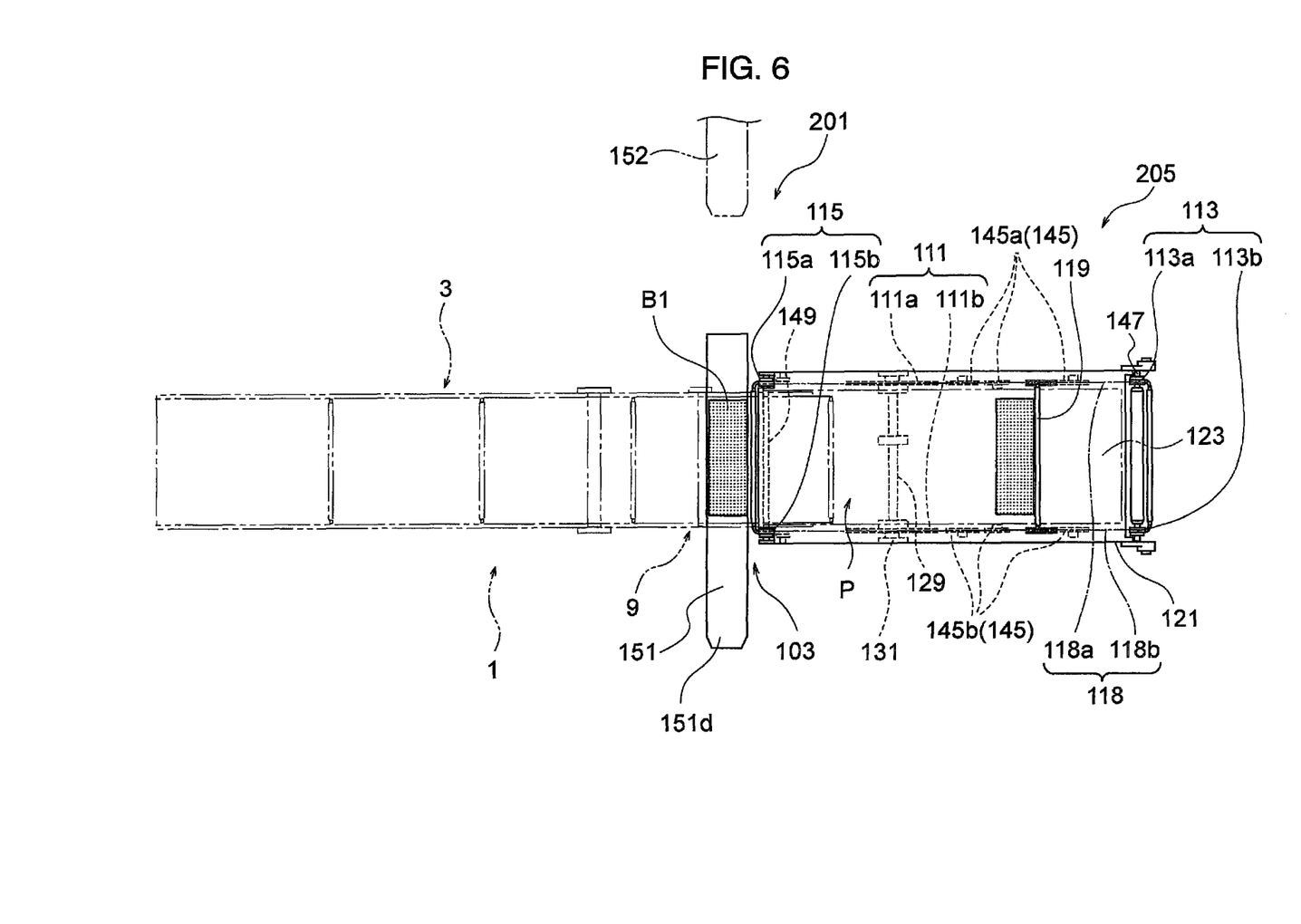
FIG. 6 is a plan view mainly illustrating a loaf bread conveying apparatus of FIG. 5.

Furthermore, the conveying path P along which the loaf bread B1 is carried on the in-feed conveyor 205 includes the in-feed plate 123 which is a rectangular plate member when viewed from above (see FIG. 6). Accordingly, the in-feed plate 123 constitutes the upper surface of the in-feed main body 121 (see FIG. 5). The in-feed plate 123 is horizontally secured to the in-feed main body 121 so that the loaf bread B1 slides along the in-feed plate 123. Note that for clarity of illustration, FIG. 6 illustrates the in-feed plate 123 with a chain double-dashed line.

A plurality of first in-feed flights 119 are attached at equal intervals in the circumferential direction of the right in-feed endless chain member 118a and the left in-feed endless chain member 118b. The first in-feed flight 119 is shaped as described in relation to FIG. 4.

As with the first embodiment, the in-feed conveyor 205 is supplied with rotational force by the drive motor 21 or a drive source to be disposed in the apparatus main body 29 (see FIG. 3). Rotating the in-feed drive sprocket wheels 111a and 111b by the rotational force of the drive motor 21 causes the in-feed endless chain 118 to rotate in the direction indicated by an arrow 133. Accordingly, the loaf bread B1 supplied from the preceding step is carried on the in-feed plate 123 by the first in-feed flight 119 from the in-feed upstream end sprocket wheel 113 to the in-feed downstream end sprocket wheel 115 along the conveying path P.

[Operation of Loaf Bread Packaging System]

The in-feed conveyor 205 conveys the loaf bread B1 having been made in the preceding step along the conveying path P by allowing the first in-feed flight 119 to urge the loaf bread B1. The first in-feed flight 119 travels at a constant speed, and the drive motor 21 is controlled by a control section (not shown) to the timing at which the loaf bread B1 is guided into the loaf bread packaging apparatus 103. As described above, when the first in-feed flight 119 reaches the in-feed downstream end sprocket wheel 115 and starts moving around the downstream end shaft 149, the loaf bread B1 is dropped from the in-feed plate 123 onto the lower scoop 151.

The in-feed contact portion 119a is circular in cross-section and rotatable. Accordingly, when the first in-feed flight 119 leaves the loaf bread B1, i.e., as the in-feed contact portion 119a rotates around the downstream end shaft 149 of the in-feed downstream end sprocket wheel 115, the in-feed contact portion 119a is smoothly separated from the loaf bread B1. The in-feed contact portion 119a constructed in this manner prevents the loaf bread from being caught by the first flight when the flight leaves the loaf bread. It is thus possible to carry the loaf bread to the next step (or the scoop) without causing the loaf bread to be scratched or partially torn off.

The bread conveying apparatus of the present invention can be used not only in the bread packaging system but also in various steps such as the step of sealing a packaging material or the step of slicing a loaf bread.

Note that the in-feed contact portion of the first and second in-feed flights is not limited to a cylindrical shape. The in-feed contact portion to contact with the loaf bread can also have a convex curved shape with a predetermined radius of curvature. That is, any shape is acceptable so long as it will not cause the loaf bread to be deformed, scratched, or partially torn off when the in-feed contact portion leaves the loaf bread while rotating around the downstream end shaft. Furthermore, the in-feed endless chain and the in-feed contact portion can be formed of various types of materials such as steel, carbon steel, stainless steel, or synthetic resin.

The loaf bread conveying apparatus of the first embodiment includes the first in-feed flight and the second in-feed flight, while the loaf bread conveying apparatus of the second embodiment includes the first in-feed flight. However, the present invention is not limited to these configurations. The number of in-feed flights and their sizes can be varied as appropriate, and the interval between in-feed flights can be changed depending on the size of the object to be conveyed or the position of placement of the object at the destination of conveyance. Furthermore, in the first embodiment, the first in-feed flight and the second in-feed flight are separated from each other. However, the first and second in-feed flights can be formed from a single member, with a plurality of in-feed contact portions provided to be in contact with a loaf bread. Furthermore, in the first and second embodiments, sprocket wheels and chains are used to transmit rotational force; however, the pulley and belt can also be used to transmit rotational force.

Note that the loaf bread packaging apparatuses of the first and second embodiments are designed to package the loaf bread in polyethylene bags. However, the present invention is not limited to this design. The packaging material is not limited to bags made of plastics such as polypropylene, polyester, or nylon, but may also be formed of a material such as paper, metal, or cloth. Furthermore, the number of first and second flights 5 and 11 can be arbitrarily changed.

Furthermore, although the first and second embodiments have been described with reference to rectangular parallelepiped loaf breads, the present invention is not limited to rectangular loaf breads but may also be applicable to a bread conveying apparatus for conveying loaf breads of various sizes and shapes and to a loaf bread cutting apparatus for cutting those loaf breads.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-211466, filed Sep. 21, 2010, which is hereby incorporated by reference herein in its entirety.

What is claimed is:

1. A bread packaging system, comprising:
    a bread conveying apparatus comprising:
    a pair of rolling members spaced apart from each other along a loaf bread conveying path;
    an endless revolving member wound around said pair of rolling members and laid along said conveying path;
    a first flight mounted to said endless revolving member to urge said loaf bread along said conveying path and carry said loaf bread to a predetermined position; and
    a loaf bread packaging apparatus including a scoop, the scoop receiving said loaf bread placed by said bread conveying apparatus and serving to package said loaf bread,
    wherein the scoop includes:
        a base portion on which said loaf bread is placed;
        an upstream flange protruding upward from an upstream end of said base portion when viewed across said conveying path, and
        a downstream flange protruding upward from a downstream end of said base portion when viewed across said conveying path, wherein said upstream or said downstream flange extend so as to form an acute angle with respect to said base portion, and
    wherein said predetermined position where said bread is carried by said first flight is located on said base portion of the scoop.

2. A bread packaging system according to claim 1, the bread conveying apparatus further comprising:
    a second flight mounted to said endless revolving member upstream of said first flight along said conveying path to urge said loaf bread so as to align said loaf bread with said predeteimined position,
    wherein said second flight is, during rotation around one of the rolling members located at a downstream side along the conveying path, fixed to the endless revolving member, and projected away from the one of the rolling members so as to be capable of being abutted to said loaf bread.

3. A bread packaging system according to claim 2, wherein one of or both of said first flight and said second flight have a curved contact portion to be in contact with said loaf bread.

4. A bread packaging system according to claim 3, wherein said contact portion of the one of or both of said first flight and/or said second flight is rotatable.

5. A bread packaging system according to claim 2, wherein said second flight aligns said loaf bread with said predetermined position by correcting a position of said loaf bread when said loaf bread is misplaced by said first flight.

6. A bread packaging system according to claim 1, wherein said predetermined position extends horizontally, viewed across said conveying path.

7. A bread packaging system according to claim 1, wherein said first flight is, during rotation around the one of the rolling members located at the downstream side along the conveying path, fixed to the endless revolving member, and projected away from the one of the rolling members so as to be capable of being abutted to said loaf bread.

8. A bread packaging system according to claim 7, wherein said first flight and a second flight are projected in a direction of a diameter of the one of the rolling members.

9. A bread packaging system according to claim 1, wherein, in a direction parallel to an axial direction of said base portion, a distance between said upstream flange and said downstream flange increases as said upstream flange and said downstream flange extend from said base portion.

10. A bread packaging system according to claim 1, wherein each of said upstream flange and said downstream flange forms an obtuse angle with the base portion in an area above said base portion that said loaf bread is located.

* * * * *